United States Patent
Okubo et al.

[11] Patent Number: 5,988,034
[45] Date of Patent: Nov. 23, 1999

[54] BLADE MOUNTING DEVICE IN CUTTING TOOL

[75] Inventors: Hideki Okubo; Shinichi Hiramatsu, both of Anjo, Japan

[73] Assignee: Makita Corporation, Anjo, Japan

[21] Appl. No.: 09/033,709

[22] Filed: Mar. 3, 1998

Related U.S. Application Data

[62] Division of application No. 08/602,152, Feb. 15, 1996, Pat. No. 5,765,463.

[30] Foreign Application Priority Data

| Feb. 15, 1995 | [JP] | Japan | 7-026787 |
| Feb. 16, 1995 | [JP] | Japan | 7-028103 |
| Mar. 8, 1995 | [JP] | Japan | 7-048377 |

[51] Int. Cl.⁶ ............................................. B23D 51/10
[52] U.S. Cl. ...................... 83/699.21; 83/747; 30/392
[58] Field of Search .................. 83/699.21, 747; 30/392, 394

[56] References Cited

U.S. PATENT DOCUMENTS

| 2,087,018 | 7/1937 | Carter . |
| 2,092,067 | 9/1937 | Oakley . |
| 3,205,722 | 9/1965 | Happe . |
| 3,494,390 | 2/1970 | Dudek . |
| 3,494,391 | 2/1970 | Mango . |
| 3,795,980 | 3/1974 | Batson . |
| 3,927,893 | 12/1975 | Dillon et al. . |
| 4,021,914 | 5/1977 | Leibundgut et al. . |
| 4,262,420 | 4/1981 | Nalley . |
| 4,283,855 | 8/1981 | Nalley . |
| 4,351,112 | 9/1982 | Nalley . |
| 4,528,753 | 7/1985 | Kuhlmann et al. . |
| 4,550,500 | 11/1985 | Kuhlmann et al. . |
| 4,610,088 | 9/1986 | Kuhlmann . |
| 5,165,173 | 11/1992 | Miller . |
| 5,267,498 | 12/1993 | Miyamoto et al. . |
| 5,306,025 | 4/1994 | Langhoff . |
| 5,402,580 | 4/1995 | Seto et al. . |
| 5,421,232 | 6/1995 | Laverick . |
| 5,661,909 | 9/1997 | Kondo et al. ............................. 30/392 |

*Primary Examiner*—M. Rachuba
*Assistant Examiner*—Sean Pryor
*Attorney, Agent, or Firm*—Dennison, Meserole, Scheiner & Schultz

[57] ABSTRACT

A blade mounting device is operable for mounting a blade on a drive shaft of a cutting tool which is moved in a predetermined motion for a cutting operation. The blade mounting device includes an operation knob mounted on a body of the cutting tool and adapted to be rotated by an operator. An actuation rod is mounted on the drive shaft and is movable with the drive shaft and rotatable relative to the drive shaft. A holder device is mounted on the drive shaft for holding and releasing the blade in response to the rotation of the actuation rod relative to the drive shaft. A connection member is rotatable with the operation knob and is disposed on the same axis as the actuation rod. A connecting mechanism is provided for connecting the connection member and the actuation rod to each other, so that the connection member and the actuation rod are axially movable relative to each other and are rotatable together with each other. The connecting mechanism includes a shaft provided on one of the connection member and the actuation rod and includes an axial hole provided on the other for receiving the shaft.

18 Claims, 10 Drawing Sheets

BLADE MOUNTING DEVICE IN CUTTING TOOL

This application is a divisional of application 08/602,152 filed Feb. 15, 1996, now U.S. Pat. No. 5,765,463.

BACKGROUND OF THE INVENTION

1. Field of the Invention

The present invention relates to a blade mounting device in a cutting tool such as a jig saw and a reciprocating s aw, and particularly to a blade mounting device having a holder mechanism which is operable to fix a blade to a drive shaft of the tool and to permit removal of the blade from the drive shaft as an actuation rod is rotated.

2. Description of the Prior Art

U.S. Pat. No. 5,165,173 discloses a blade mounting device as shown in FIG. 16 which corresponds to FIG. 5 of this patent. The blade mounting device includes a tubular drive shaft 103 having a female thread formed on Its inner peripheral surface. A lock screw or actuation rod 128 is in engagement with the female thread of the drive shaft 103, so that a blade B can be held in position or can be released by rotating the actuation rod 128 to move the same toward and away from the head of the blade B. The actuation rod 128 has an extension 129 having a semi-circular configuration in section and extending upwardly. An operation rod or connecting rod 130 having a semi-circular configuration in section similar to the sectional configuration of the extension 129 is inserted into the drive shaft 103 with its flat side surface slidably contacting the flat side surface of the extension 129. (The connecting rod 130 is not threadably engaged with the inner wall of the drive shaft 103.) An operation knob 137 is connected to the upper portion of the connecting rod 130 via a clutch 131, so that the extension 129 or the actuation rod 128 as well as the connecting rod 130 can be rotated when the operation knob 137 is rotated.

However, with this conventional construction, the rotational force applied to the operation knob 137 is transmitted to the actuation rod 128 by rotating the connecting rod 130 together with the extension 129 with the flat side surfaces of the connecting rod 130 and the extension 129 contacting each other. Since the connecting rod 130 and the extension 129 are inserted into the driving shaft 103 having a diameter which cannot be unduly increased from a viewpoint of design, they may not have a diameter which provides a sufficient strength. For this reason, when the operation knob 137 is rotated, the operation rod 130 or the extension 129 tends to be resiliently deformed and distorted. Otherwise, the operation rod 130 and the extension 129 may slide to be displaced from each other in the diametrical direction. When such distortion or displacement has been caused, the operational rod 130 or the extension 129 is pressed on the inner peripheral surface of the drive shaft 103, so that a resistance force against the rotation of the operational rod 130 or the extension 129 is produced to reduce the rotational force to be transmitted. Therefore, the rotational force transmitted to the extension 129 becomes unstable, and consequently, the blade B cannot be reliably fixed in position.

SUMMARY OF THE INVENTION

It is, accordingly, an object of the present invention to provide a blade mounting device which is operable to reliably fix a blade in position.

It is another object of the present invention to provide a blade mounting device which is operable to reliably transmit the rotational force of an operation knob to an actuation rod for actuation of a blade holder mechanism.

It is a further object of the present invention to provide a blade mounting device in which the rotation of a connecting member connected to an operation knob is transmitted to an actuation rod for actuation of a blade holder mechanism without causing distortion of the connecting member and the actuation knob and without causing displacement from each other in the diametrical direction.

According to the present invention, there is provided a blade mounting device for mounting a blade on a drive shaft of a cutting tool which is moved in a predetermined motion for a cutting operation, comprising:

an operation knob mounted on a body of the cutting tool and adapted to be rotated by an operator;

an actuation rod mounted on the drive shaft, the actuation rod being movable with the drive shaft and being rotatable relative to the drive shaft;

a holder device mounted on the drive shaft for holding and releasing the blade in response to the rotation of the actuation rod relative to the drive shaft;

a connection member rotatable with the operation knob and disposed on the same axis as the actuation rod; and a connecting mechanism for connecting the connection member and the actuation rod to each other, so that the connection member and the actuation rod are axially movable relative to each other and are rotatable together with each other;

the connecting mechanism including a shaft provided on one of the connection member and the actuation rod and including an axial hole provided on the other for receiving the shaft.

With this construction, a part of the connection member or the actuation rod having the shaft or the axial hole may have a rigidity greater than the conventional connecting portions having a semi-circular configuration in section and may not cause displacement in the diametrical direction. In addition, the rotational torque applied to the operation knob is transmitted to the actuation rod without causing loss of torque, so that the blade can be reliably held in position by a greater force.

The invention will become more fully apparent from the claims and the description as it proceeds in connection with the drawings.

DETAILED DESCRIPTION OF THE PREFERRED EMBODIMENTS

A first embodiment of the present invention will now be described with reference to FIGS. 1 to 9.

Figure 1:
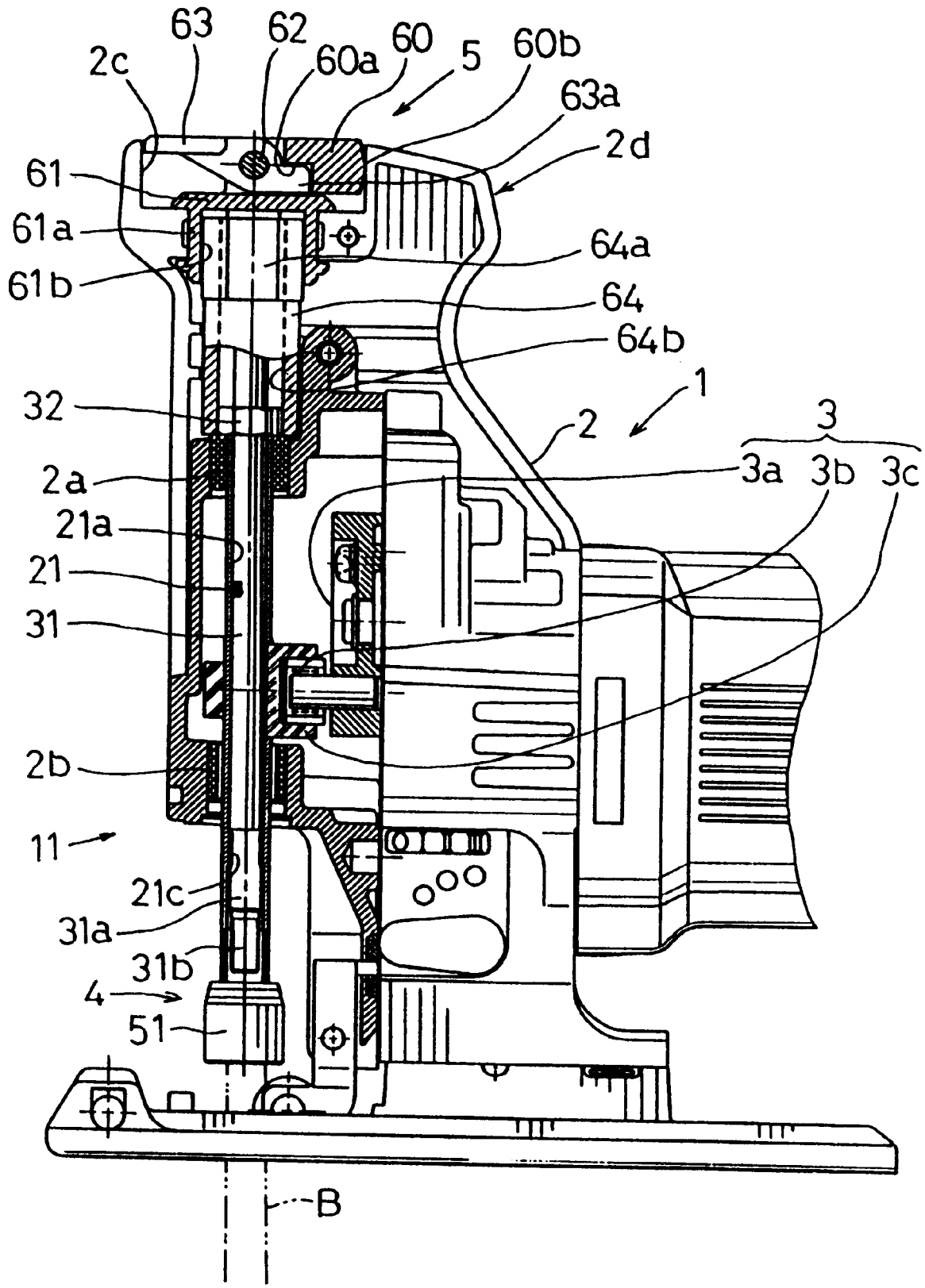
FIG. 1 is a view, with a part broken way, of a front portion of a jig saw incorporating a blade mounting device according to a first embodiment of the present invention.

Referring to FIG. 1, there is shown a front portion of a jig saw 1 incorporating a blade mounting device 11 of the present invention.

The jig saw 1 has a body including a housing 2 in which a motor having an output shaft and serving as a drive source is accommodated. The rotation of the motor is converted into a vertical reciprocal movement of a drive shaft 21 by means of a motion conversion mechanism 3 including a crank plate 3a, a guide roller 3b and a guide rail 3c, etc. The drive shaft 21 is supported within a front portion (left side in FIG. 1) of the housing 2 by means of bearings 2a and 2b, so that the drive shaft 21 is vertically reciprocally moved by the motion conversion mechanism 3. A grip portion 2d is formed on the top (front upper portion) of the housing 2 and is so configured as to be easily grasped by an operator. During a cutting operation, the operator grasps the grip portion 2d with his one hand and holds the rear side of the housing 2 with his other hand. Thus, the jig saw 1 of this embodiment is intended to be grasped with both hands of the operator.

Figure 4:
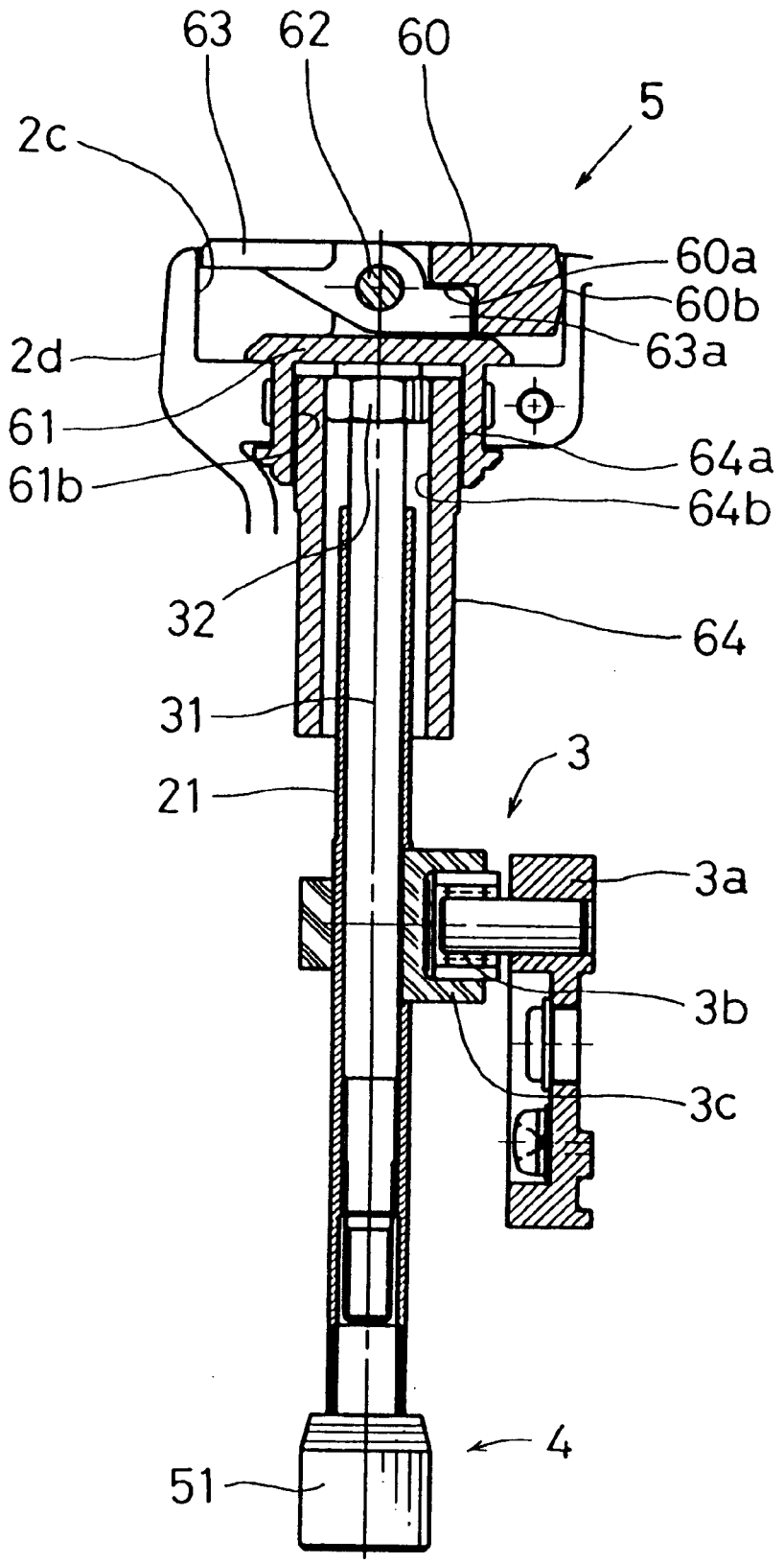
FIG. 4 is a vertical sectional view of the blade mounting device in a state where a drive shaft is in its upper stroke end.
Figure 5:
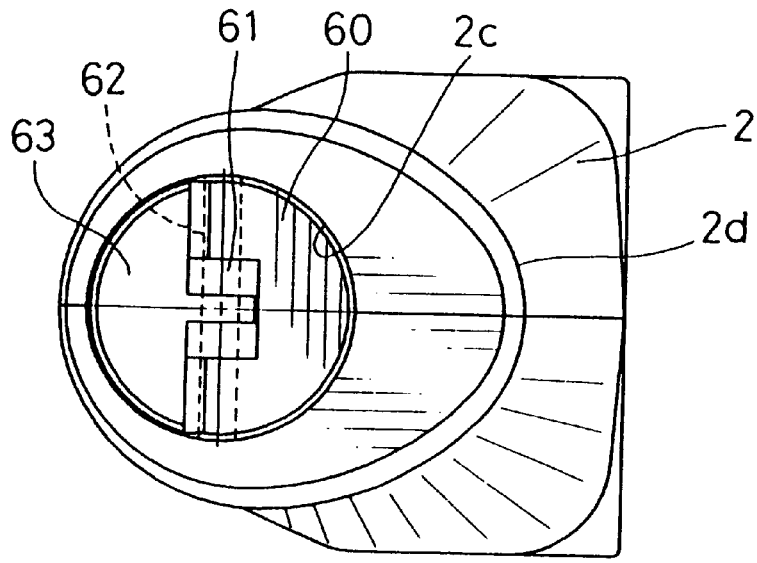
FIG. 5 is a plan view of an operation knob of the blade mounting device with the operation knob positioned within a recess formed in a grip portion of a body of the jig saw.

As shown in FIG. 4, the blade mounting device 11 generally includes the drive shaft 21 as described above, an actuation rod 31 inserted into an axial hole 21a of the drive shaft 21, a clamp device 4 for clamping a blade B, and an operation mechanism 5 which serves to open and close the clamp device 4.

Figure 2:
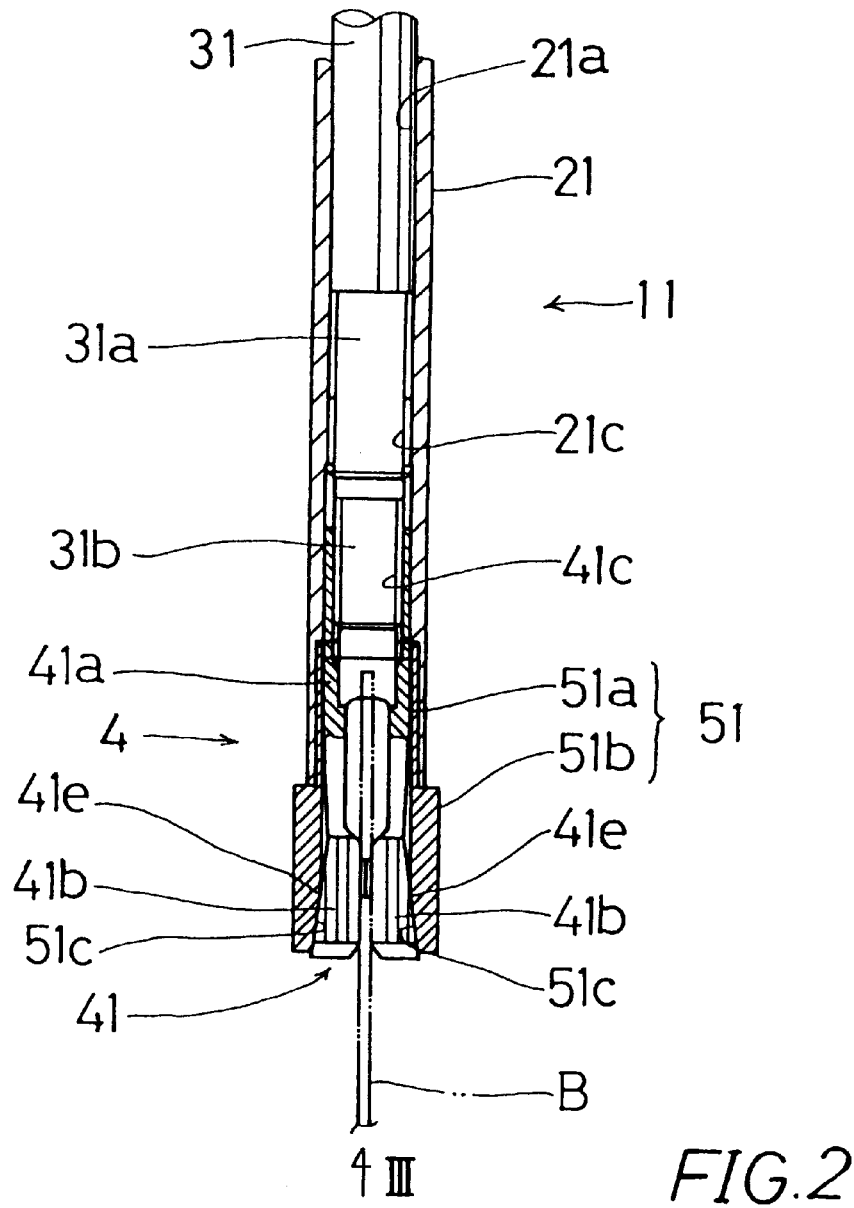
FIG. 2 is a vertical sectional view of a lower part the blade mounting device shown in FIG. 1.

As shown in FIG. 2, the drive shaft 21 includes an axial hole 21a having a left hand female thread 21c. The actuation rod 31 has a lower portion having a left hand male thread 31a and a right hand male thread 31b formed in series in the downward direction on its outer surface. The left hand male thread 31a is in engagement with the left hand female thread 21c, so that the actuation rod 31 is movable relative to the drive shaft 21 in the axial direction when the actuation rod 31 is rotated. The actuation rod 31 has an upper end which extends upwardly of the drive shaft 21 and which is positioned above the bearing 2a. A hexagon nut 32 is fixedly mounted on the upper end of the actuation rod 31.

Figure 3:
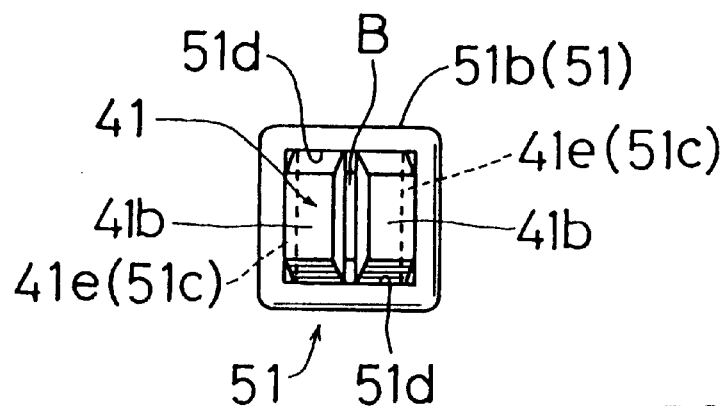
FIG. 3 is a bottom view of FIG. 2 as viewed in the direction indicated by an arrow III in FIG. 2.

The actuation rod 31 cooperates with the clamp device 4 which will now be explained with reference to FIGS. 2 and 3. The clamp device 4 includes a clamping claw 41 and a cap 51. The clamping claw 41 is inserted into the cap 51 and has a tubular portion 41a and a pair of claws 41b, so that the clamping claw 41 has a fork-like configuration. The cap 51 has an upper tubular portion 51a which is inserted into the lower end of the drive shaft 21 and is secured thereto. The tubular portion 41a of the clamping claw 41 is axially movably received within the tubular portion 51a. The tubular part 41a has a right hand female thread 41c which is formed in its upper part and is in engagement with the right hand male thread 31b of the actuation rod 31, so that the clamping claw 41 is connected to the lower end of the actuation rod 31. Each of the claws 41b has an outer surface 41e inclined outwardly in the downward direction. The cap 51 has a tubular portion 51b which has a square configuration in section and has two pairs of confronting inner walls 51c and 51d. The pair of the inner walls 51c are inclined at the same angle as the outer surfaces 41e of the claws 41b, so that the outer surfaces 41e slidably contact the inner walls 51c. Each of the claws 41b has both lateral surfaces which extend vertically and which slidably contact the pair of the inner walls 51d of the tubular portion 51b, so that the inner walls 51d serve to guide the claws 41b when the claws 41b are moved to be opened and closed (in the left and right directions in FIG. 3). The inner walls 51d also serve to prevent the claws 41b from rotation.

With the clamp device 4 thus constructed, when the actuation rod 31 is rotated in the right hand direction, the actuation rod 31 is moved to retract upwardly by the anti-screwing action of the left hand male thread 31a relative to the left hand female thread 21c, so that the clamping claw 41 is moved upwardly together with the actuation rod 31. Since the clamping claw 41 is prevented from rotation, the right hand male thread 31b of the actuation rod 31 is screwed downwardly into the right hand female thread 41c of the clamping claw 41, so that the clamping claw 41 is moved upwardly also relative to the actuation rod 31. As the result, the clamping claw 41 is moved upwardly by the sum of the distance of movement of the actuation rod 31 relative to the drive shaft 31 and the distance of movement of the clamping claw 41 itself relative to the actuation rod 31. Therefore, the clamping claw 41 is moved upwardly by a greater distance through a slight rotation of the actuation rod 31. As the clamping claw 41 is moved upwardly, the claws 41b are gradually moved toward each other through cooperation between the inclined outer surfaces 41e of the claws 41b and the inclined inner surface 51c of the cap 51, so that the head of the blade B inserted between the claws 41b is clamped and is fixed in position.

On the other hand, when the actuation rod 31 is rotated in the left hand direction, the left hand male thread 31a is screwed into the left hand female thread 21c, so that the actuation rod 31 is moved downwardly relative to the drive shaft 21. The clamping claw 41 is then moved downwardly together with the actuation rod 31. At the same time, the right hand male thread 31b of the actuation rod 31 acts on the right hand female thread 41c in an anti-screwing manner, so that the clamping claw 41 is moved downwardly also relative to the actuation rod 31. As the result, the clamping claw 41 is moved downwardly by the sum of the distance of movement of the actuation rod 31 due to the screwing action of the left hand male thread 31a into the left hand female thread 21c and the distance of movement of the clamping claw 41 itself relative to the actuation rod 31 due to the anti-screwing action of the right hand male thread 31b relative to the right hand female thread 41c. Therefore, the clamping claw 41 is moved downwardly by a greater distance through a slight rotation of the actuation rod 31. When the clamping claw 41 is thus moved downwardly, the claws 41b become free from the inclined inner surface 51c of the cap 51 and are resiliently moved away from each other, so that the clamping claw 41 is opened. Then, the blade B can be removed from the clamping claw 41.

The operation mechanism 5 for the clamping mechanism 4 will now be explained. As described previously, the grip portion 2d is formed on the top of the housing 2 and is so configured as to be easily grasped by the operator. A substantially circular recess 2c is formed in substantially the center of the upper surface of the grip portion 2d. An operation knob 60 having a substantially semi-circular configuration is disposed within the circular recess 2c. The operation knob 60 is vertically pivotally connected to an upper end of a support member 61 via a pivot pin 62 through which a pushing plate 63 configured for pushing out the operation knob 60 from the circular recess 2c and having a substantially semi-circular configuration. The pushing plate is also vertically pivotally supported. The pushing plate 63 and the operation knob 60 both in their horizontal position shown in FIG. 4 substantially close the circular recess 2c. A projection 60b having a substantially triangular configuration in section is formed on the circumferential surface of the operation knob 60. The diameter of the operation knob 60 or the diameter of the circular recess 2c is determined such that the projection 60b is pressed on the circumferential wall of the circular recess 2c to provide an appropriate frictional force when the circular recess 2c is closed as described above.

Figure 6A:
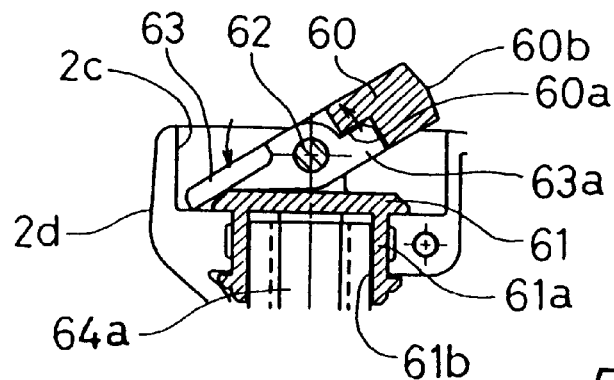
FIGS. 6(A) and 6(B) are views showing different operations of the operation knob.
Figure 6B:
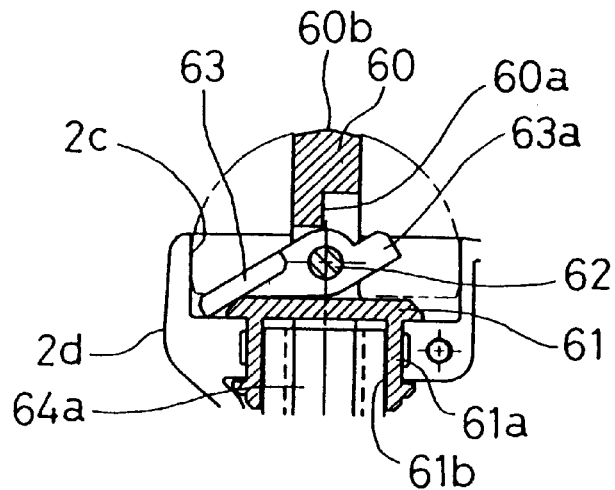

An engaging recess 60a is formed on the lower surface of the operation knob 60 and is adapted to receive a corresponding engaging protrusion 63a formed on the pushing plate 63. When a part of the pushing plate 63 on the opposite side of the engaging protrusion 63a is pushed downwardly, the engaging protrusion 63a engages the operation knob 60 to pivot the operation knob 60 upwardly, so that the peripheral portion of the operation knob 60 is raised from the circular recess 2c as shown in FIG. 6(A). The operator then grasps the peripheral portion of the operation knob 60 with his hand to pivot the operation knob 60 further upwardly, so that the operation knob 60 consequently reaches an upstanding position for rotation by the operator as shown in FIG. 6(B).

The support member 61 has a cylindrical support portion 61a on its lower side. The support portion 61a is rotatably supported by the housing 2 at the bottom of the circular recess 2c, so that the support member 61 rotates with the operation knob 60 when the operation knob 60 in the upstanding position is rotated by the operator. The cylindrical support portion 61a has a hexagon hole 61b formed therein for receiving a corresponding hexagonal shaft portion 64a of a connection sleeve 64. Thus, the connection sleeve 64 is connected to the support member 61 such that the connection sleeve 64 is prevented from rotation relative to the support member 61 but is rotatable with the support member 61 when the operation knob 60 is rotated. Here, the connection sleeve 64 is held in position in the axial direction between the support member 61 and the bearing 2a.

A hexagon hole 64b corresponding to the hexagon nut 32 mounted on the upper end of the actuation rod 31 is formed in the connecting sleeve 64 throughout its length for receiving the hexagon nut 32, so that the actuation rod 31 is prevented from rotation relative to the connection sleeve 64 but is movable in the axial direction relative to the connection sleeve 64. Thus, the actuation rod 31 is rotated with the connection sleeve 64 when the operation knob 60 is rotated. However, the actuation rod 31 is movable in the axial direction independently of the rotation of the connection sleeve 64 or the operation knob 60, so that the actuation rod 31 is reciprocally moved with the drive shaft 21. FIGS. 1 and 4 show the states where the hexagon nut 32 as well as the drive shaft 21 is at its lower stroke end and its upper stroke end, respectively, and where the blade B has been moved downwardly and upwardly, respectively. At the lower stroke end and the upper stroke end shown in FIGS. 1 and 4, the hexagon nut 32 is positioned in the lower end of the connection sleeve 64 and in the upper end of the same, respectively. Between the inner wall of the hexagon hole 61b of the support member 61 and between the inner wall of the hexagon hole 64b and the hexagon nut 32, suitable gaps are provided, respectively, so that the deflection of the axis of the drive shaft 21 during the reciprocal movement can be absorbed by these gaps. As shown in FIG. 4, the upper portion of the drive shaft 21 enters the connection sleeve 64 when the drive shaft 21 is moved to its upper stroke end.

With the blade mounting device 11 thus constructed, when the operator pushes the pushing plate 63 into the circular recess 2c, the operation knob 60 is pivoted upwardly, so that the peripheral part of the operation knob 60 is raised from the circular recess 2c (see FIG. 6(A)). The operator then pulls the operation knob 60 upwardly away from the pushing plate 63 to the upstanding position (see FIG. 6(B)). With the operation knob 60 in the upstanding position, the operator rotates the operation knob 60 in the right hand direction, so that the operation rod 31 is rotated together with the operation knob 60 via the support member 61 and the connection sleeve 64. The clamping claw 41 of the clamping device 4 is therefore closed as described above and the blade B is fixed in position. When the operator rotates the operation knob 60 in the left hand direction, the rotation of the operation knob 60 is transmitted to the actuation rod 31 via the support member 61 and the connection sleeve 64, so that the clamping claw 41 is opened to permit removal of the blade B.

Figure 16:
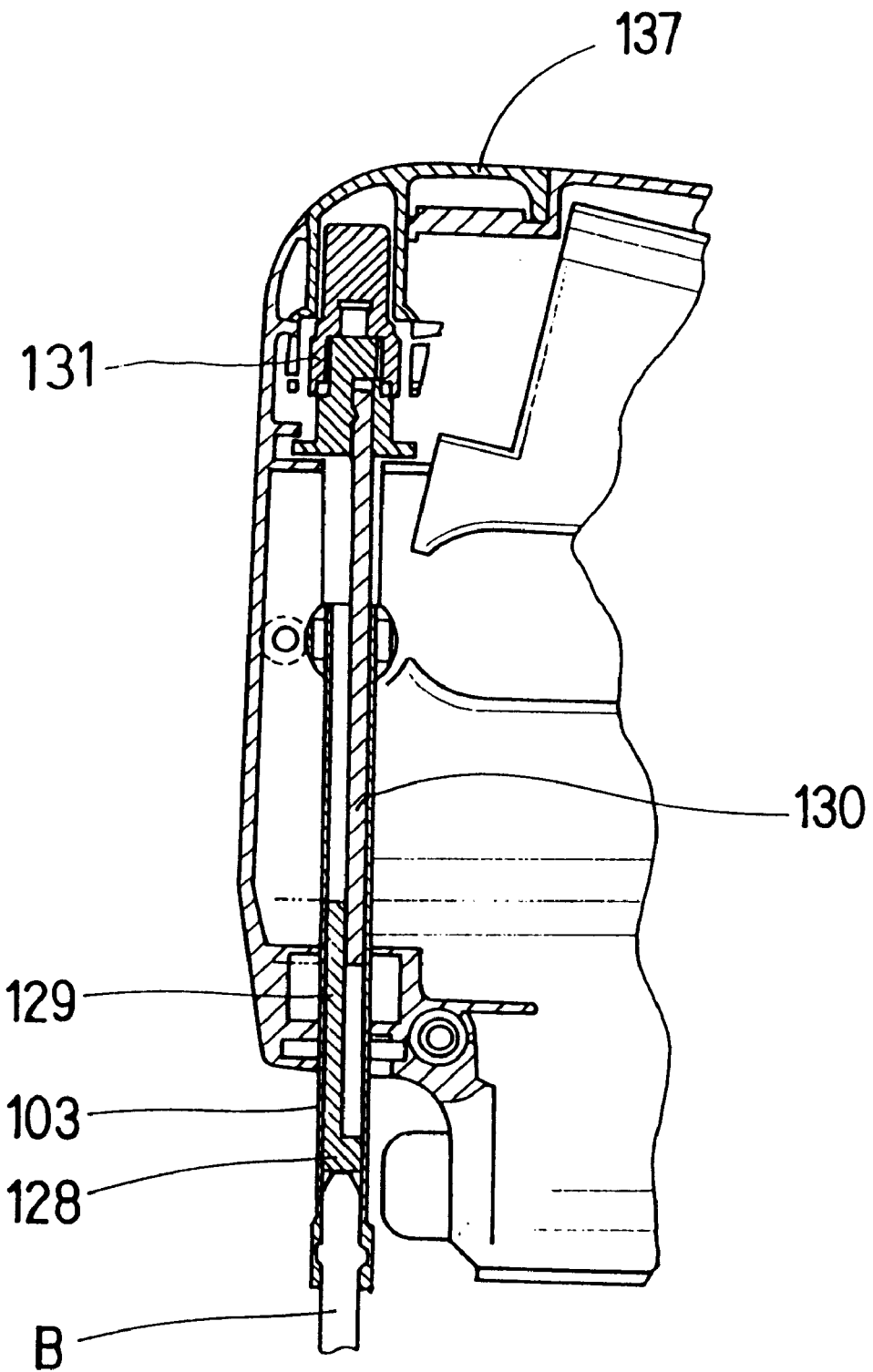
FIG. 16 is a vertical sectional view of a conventional blade mounting device.

Thus, with this embodiment, transmission of rotational torque between the connection sleeve 64 and the actuation rod 31 is performed through the connecting means which includes the hexagon hole 64b of the connection sleeve. 64 and the hexagon nut 32 inserted thereto. This connecting means is quite different from the conventional connecting means including the rod 130 and the extension 129 which are semi-circular in section and which have the flat surfaces extending In the diametrical direction and contacting each other as explained with reference to FIG. 16. Since the connecting sleeve 64 having the hexagonal hole 64b as well as the actuation rod 31 having the hexagon nut 32 may have a greater rigidity against distortion compared with the conventional semi-circular rod 130 or the extension 129, the rotation of the operation knob 60 is reliably transmitted to the actuation rod 31 without causing loss of torque even if the operation knob 60 is rotated by a greater force. Therefore, the blade B can be reliably fixed in position by a greater force. In addition, by virtue of the greater rigidity against distortion, the operation knob 60 is no longer rotatable after the blade B has been completely fixed by the clamping claw 41. In contrast, with the conventional construction, since the rod 130 and the extension 129 are liable to be distorted, the operation knob 137 may be further rotated after the blade B has been fixed in position. Thus, with the construction of this embodiment, the operator can distinctly recognize that the blade B has been completely fixed, so that the blade mounting device 11 of this embodiment exhibits an excellent operation feeling.

In addition, with this embodiment, the circular recess 2c is formed in the grip portion 2d of the front and upper side of the housing 2 and is adapted for receiving the operation knob 60. The operation knob 60 is vertically pivotable between the horizontal position or a retracted position for closing the circular recess 2c and the upstanding position or an operational position. In the retracted position, the entire operation knob 60 is within the circular recess 2c, and in this position, the projection 60b appropriately contacts the peripheral wall of the circular recess 2c for holding the operation knob 60 in position. Therefore, the operation knob 60 is reliably held within the circular recess 2c while it is prevented from pivotal movement. This may reliably prevent the operation knob 60 from being accidentally operated during the cutting operation with the grip portion 2d grasped by the operator, so that the mounting state of the blade B can be reliably maintained.

Further, since the operation knob 60 can be easily moved to the upstanding position or the operational position after the pushing plate 63 has been pushed to rise the peripheral portion of the operation knob 60, the operation knob 60 can be easily prepared for the rotational operation without performing troublesome operations, so that this embodiment is excellent in operability. Additionally, when the entire operation knob 60 is within the circular recess 2c, the operation knob 60 and the pushing plate 63 extend horizontally, so that their upper surfaces are positioned substantially flush with the upper surface of the grip portion 2d. The operation mechanism 5 is therefore excellent from a viewpoint of design.

The above embodiment may be variously modified. For example, the support member 61 may be formed integrally with the connection sleeve 64. The hexagonal shaft portion 64a of the connection sleeve 64 and its corresponding hexagon hole 61b of the cylindrical portion of the support member 61 as well as the hexagon hole 64b of the connection sleeve 64 and its corresponding hexagon nut 32 may have any other polygonal configuration such as square and triangle. Otherwise, the configuration may be elliptic or other non-circular configuration such as a gear-like configuration which is usually used in a spline or a serration connection mechanism. Thus, any configurations may be incorporated for connecting these two members if such configurations permit these two members to rotate together and to permit movement in the axial direction relative to each other.

Although not shown in the drawings, the hexagon nut 32 and the hexagon hole 64b may be replaced by each other. Thus, the hexagon nut 32 may be mounted on the support member 61 while the hexagon hole 64b is formed in the actuation rod 31. With this arrangement, the same operation and effect as the above embodiment can be attained.

Although with the clamp device 4 of this embodiment, the blade B is released and fixed to open and close the clamping claw 41 through rotation of the actuation rod 31, any other kind of clamp device may be used for cooperation with the operation mechanism 5 if the device is operated through rotation of the actuation rod 31. For example, the clamp device 4 may include a lock screw which is moved toward and away from the blade B for pressing and releasing the blade B through rotation of the actuation rod 31 as in the conventional clamp device described previously with reference to FIG. 16.

Figure 8:
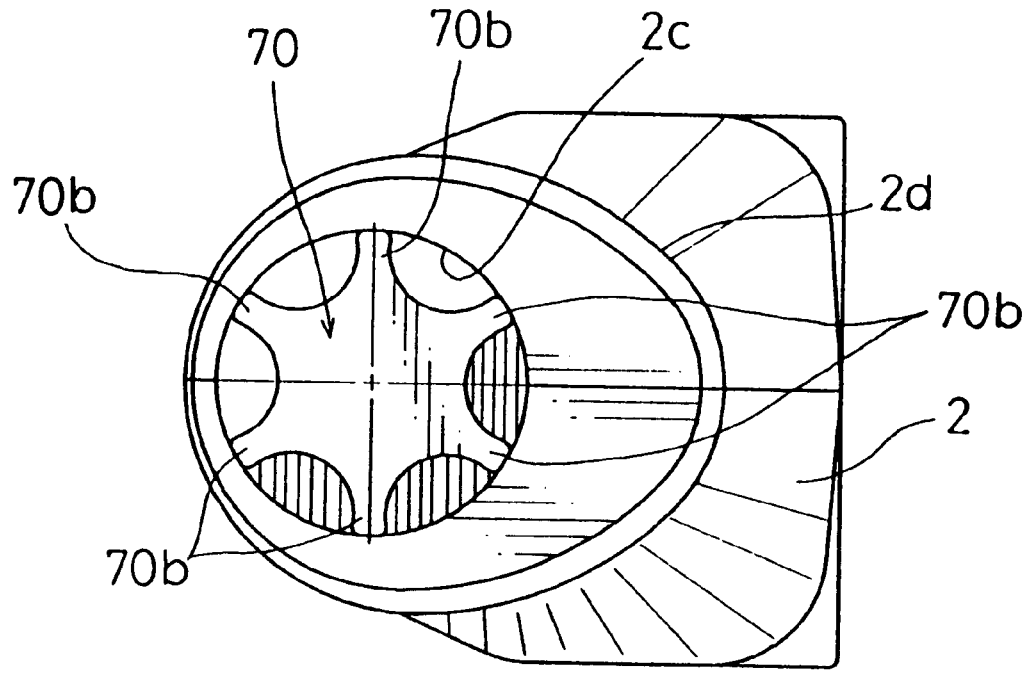
FIG. 8 is a plan view of an operation knob of the blade mounting device shown in FIG. 7 with the operation knob positioned within a recess formed in a grip portion of a body of the jig saw.
Figure 9:
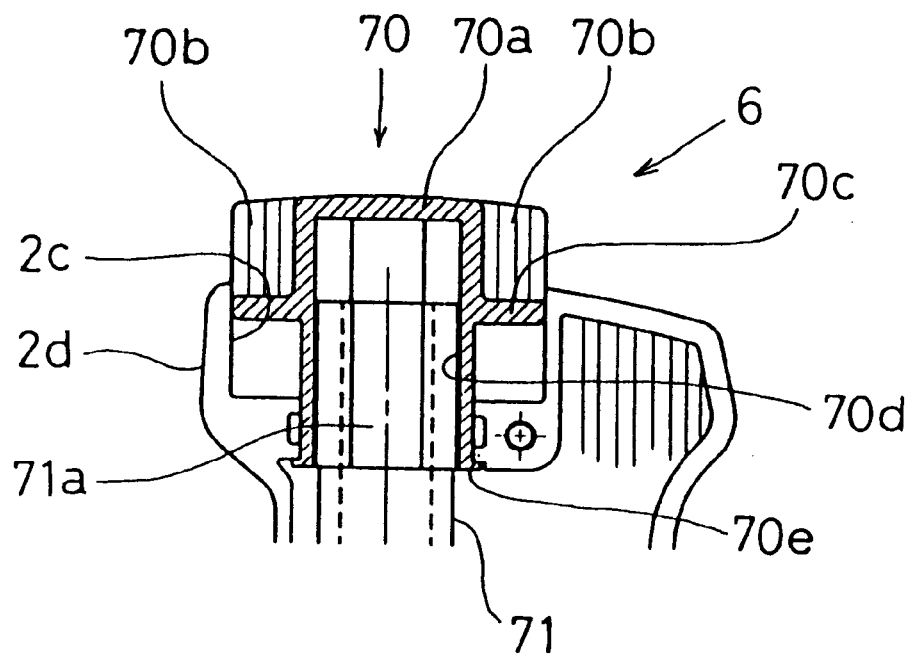
FIG. 9 is a sectional view of an operation device of the blade mounting device shown in FIG. 7.

A second embodiment of the present invention will now be explained with reference to FIGS. 7 to 9. This embodiment is a modification of the first embodiment and is different from the first embodiment in the operation device 6. Like members are given the same reference numerals and their description will not be repeated.

The operation device 6 of this embodiment includes an operation knob 70 having a cylindrical portion 70a. The cylindrical portion 70a has a closed top and includes an outwardly extending flange portion 70c formed in the middle position in the vertical direction. Six operation fins 70b are formed on the flange portion 70c and extend in the radial direction of the cylindrical portion 70a. The operation fins 70b are equally spaced from each other in the circumferential direction. A hexagon hole 70d is formed axially in the cylindrical portion 70a. The cylindrical portion 70a, the flange portion 70c and the operation fins 70b are formed integrally with each other. The lower half of the cylindrical portion 70a below the flange portion 70c is inserted into a part of the housing 2 forming the bottom of the circular recess 2c, so that the operation knob 70 is vertically slidable and axially movable relative to the housing 2.

Figure 7:
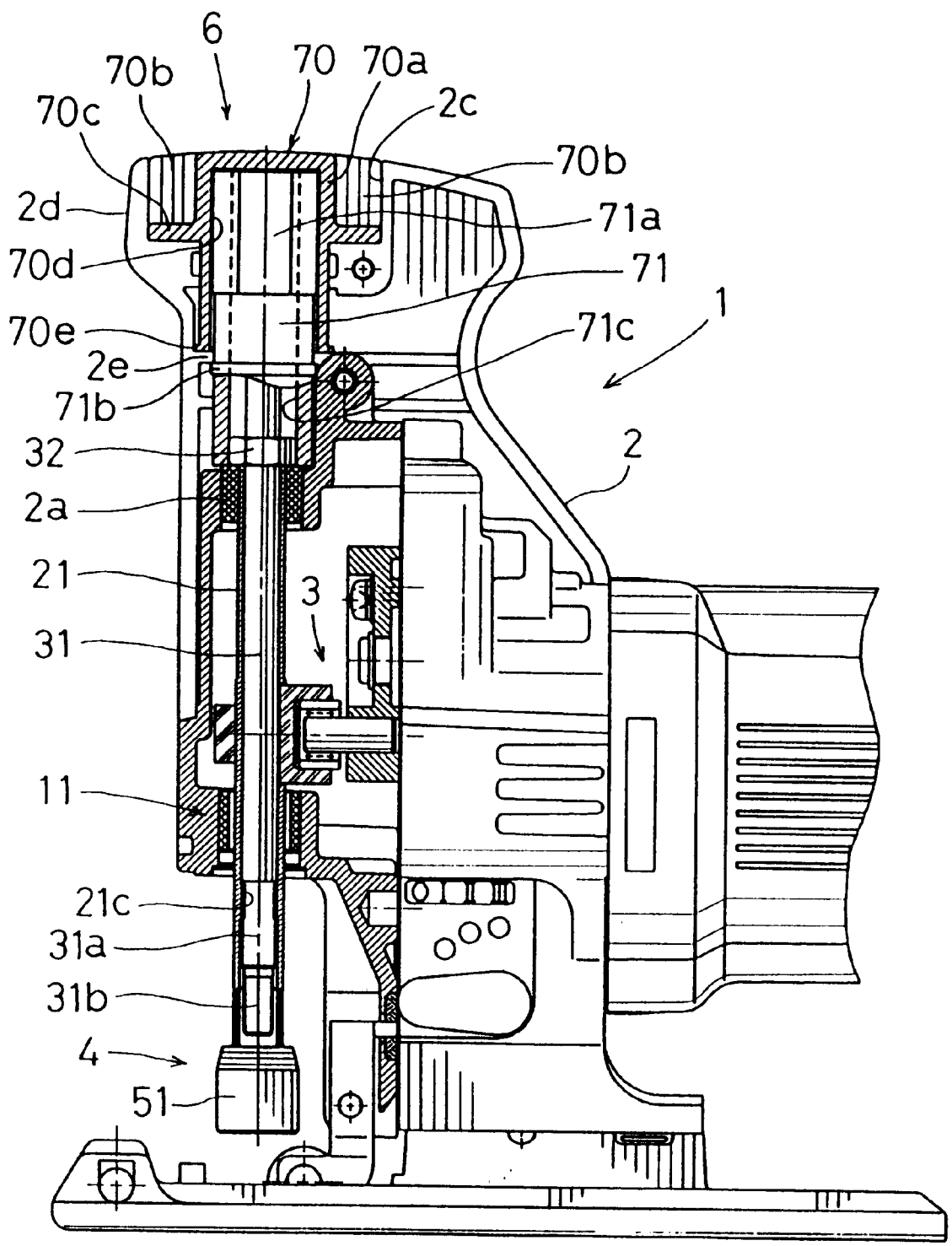
FIG. 7 is a view similar to FIG. 1 but showing a jig saw incorporating a blade mounting device according to a second embodiment of the present invention.

As shown in FIG. 7, the operation knob 70 is moved downwardly until the flange portion 70c abuts on the bottom, so that the entire operation knob 70 is positioned within the circular recess 2c. In this state, the upper end of the cylindrical portion 70a and the upper ends of the operation fins 70b are positioned substantially flush with the upper surface of the grip portion 2d. The cylindrical portion 70a has a stopper edge 70e formed on its lower end and extending radially outwardly, so that the operation knob 70 can be moved upwardly and raised from the circular recess 2c until the stopper edge 70e abuts on the lower surface of the part of the housing 2 forming the bottom of the circular recess 2c. In this raised position, the flange portion 70c closes the interior of the circular recess 2c. Thus, with this embodiment, the operator can take the operation knob 70 out from the circular recess 2c with his fingers inserted between two adjacent operation fins 70b to grasp the cylindrical portion 70a. With the operation knob 70 thus taken out from the circular recess 2c, the operator rotates the operation knob 70 by engaging his fingers with the operation fins 70b, so that the operation knob 70 can be rotated with an excellent operation feeling. When the operation knob 70 is not to be operated, the operator pushes the operation knob 70 into the circular recess 2c, so that the operation knob 70 is positioned within the circular recess 2c in a manner not extending upwardly beyond the upper surface of the grip portion 2d.

A connection sleeve 71 has a hexagon shaft portion 71a having a configuration corresponding to the configuration of the hexagon hole 70d of the cylindrical portion 70a, and the hexagon shaft portion 71a is axially movably inserted into the hexagon hole 70d. A stopper flange 71b is formed on the middle portion of the connection sleeve 71 in the vertical direction. The stopper flange 71b normally abuts on a rib 2e formed on the housing 2, while the lower end of the connection sleeve 71 is in abutment on the upper bearing 2a, so that the connection sleeve 71 is prevented from moving in the vertical direction.

The connection sleeve 71 has a hexagon hole 71c formed therein. The hexagon hole 71c receives the hexagon nut 32 of the actuation rod 31 in the same manner as the first embodiment.

The blade mounting device 11 having the operation device 6 of this second embodiment as described above also ensures the sufficient rigidity against distortion between the operation knob 70 and the connection sleeve 71. and between the connection sleeve 71 and the actuation rod 31, so that the operational force is effectively transmitted to the actuation rod 31. Therefore, the blade B can be reliably fixed by rotating the operation knob 70 by a greater force.

Even if the operation knob 70 remains in the raised position, the operation knob 70 is naturally forced to move downwardly when the operator grasps the grip portion 2d for the cutting operation. Therefore, the operation knob 70 is effectively prevented from remaining in the raised position, and the operation knob 70 is reliably prevented from being accidentally operated.

Figure 10:
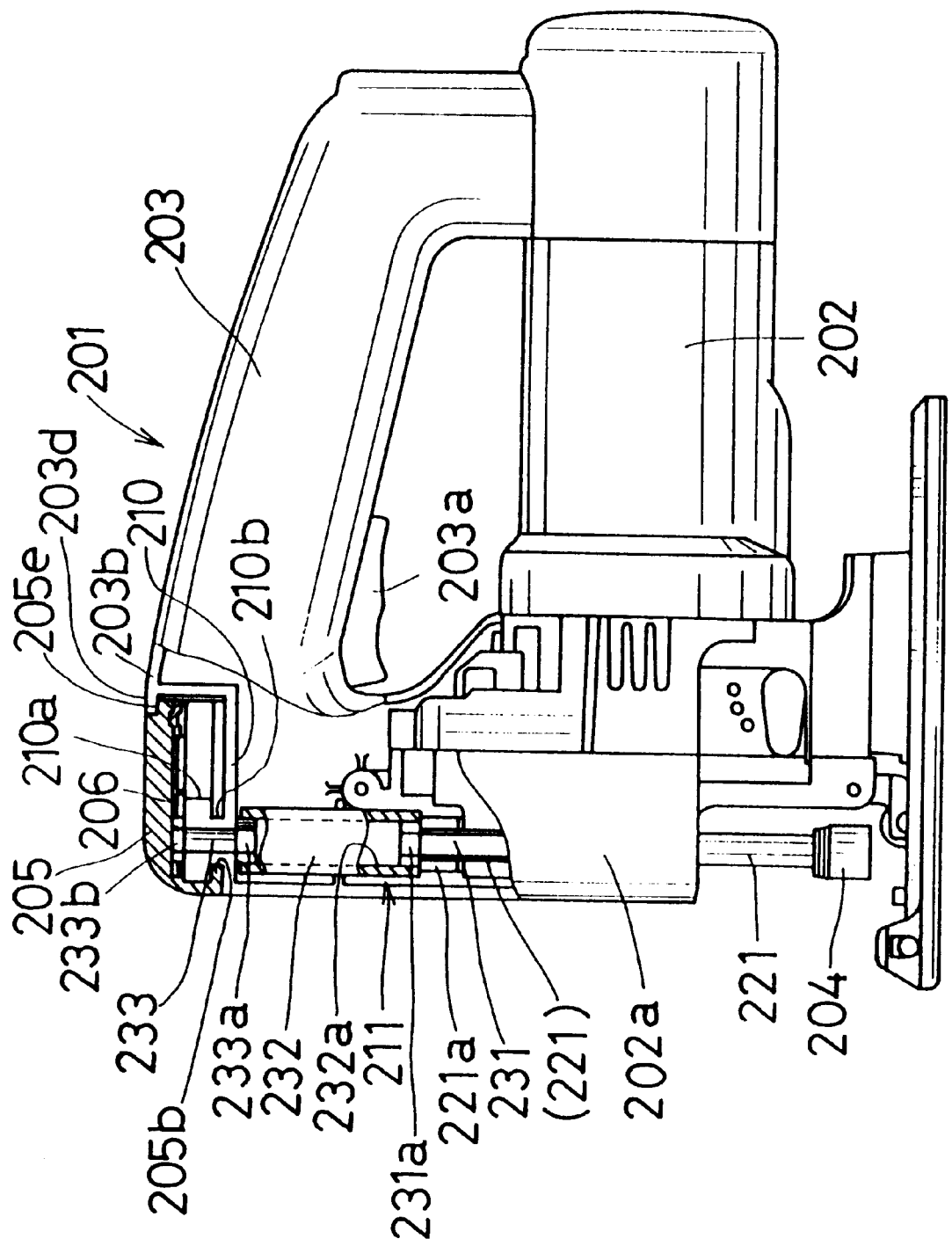
FIG. 10 is a view, with a part broken away, of a jig saw incorporating a blade mounting device according to a third embodiment of the present invention.

A third embodiment of the present invention will now be explained with reference to FIGS. 10 to 15. FIG. 10 shows a jig saw 201 incorporating a blade mounting device 211 according to the third embodiment. The construction of the jig saw 201 is substantially the same as the jig saw 1 of the first embodiment except the construction of the blade mounting device 211. The jig saw 201 of this embodiment includes a body 202 in which a motor (not shown) as a drive source is disposed. The rotation of the motor is converted into a vertical reciprocal movement of a drive shaft 221 by a motion conversion mechanism which is disposed within a front housing 202a of the body 202 and which is similar to the motion conversion mechanism of the first embodiment. The body 202 includes a substantially D-shaped handle 203. A trigger switch 203a is mounted on the lower portion of the handle 203 for starting and stopping the motor.

The blade mounting device 211 of this embodiment is disposed on the front side of the jig saw 201 and generally includes the drive shaft 221 described above, an actuation rod 231, a clamp device 204 and an operation knob 205. The actuation rod 231 has a male thread part (not shown) which is in engagement with a female thread part formed on an inner wall of an axial hole (not shown) of the drive shaft 221, so that the actuation rod 231 is moved vertically relative to the actuation rod 231 when it is rotated. The clamp device 204 has a clamping claw (not shown) which is similar to the clamp device of the first embodiment and is closed and opened for fixing and releasing a blade as the actuation rod 231 is moved vertically. The operation knob 205 is operable by the operator to rotate the actuation rod 231.

A hexagon shaft portion 231a is formed on the upper end of the actuation rod 231. A connection sleeve 232 includes a hexagon hole 232 formed therein. The hexagon hole 232a has a configuration corresponding to the hexagon shaft portion 231a of the actuation rod 231 for receiving the same, so that the actuation rod 231 is rotated with the connection sleeve 232 and is moved vertically relative to the connection sleeve 232 when the connection sleeve 232 is rotated. The connection sleeve 232 is positioned between an upper bearing 221a and a support member 210 of a front end of a handle housing 203 which forms the handle 203, so that the connection sleeve 232 is prevented from vertical movement.

A connecting rod 233 has a lower end having a hexagon shaft portion 233a which is inserted into the upper side of the hexagon hole 232a of the connection sleeve 232, so that the actuation rod 231 as well as the connection sleeve 232 is rotated with the connection rod 233 when the connection rod 233 is rotated.

The support member 210 has a cylindrical support portion 210a for rotatably receiving the connecting rod 233. The connecting rod 233 has a hexagon shaft portion 233b formed on its upper end which extends upwardly from the cylindrical support portion 210a. By means of the hexagon shaft portion 233b, the connecting rod 233 is connected to the operation knob 205 for rotation therewith and for disconnection therefrom as will be explained later.

Figure 11:
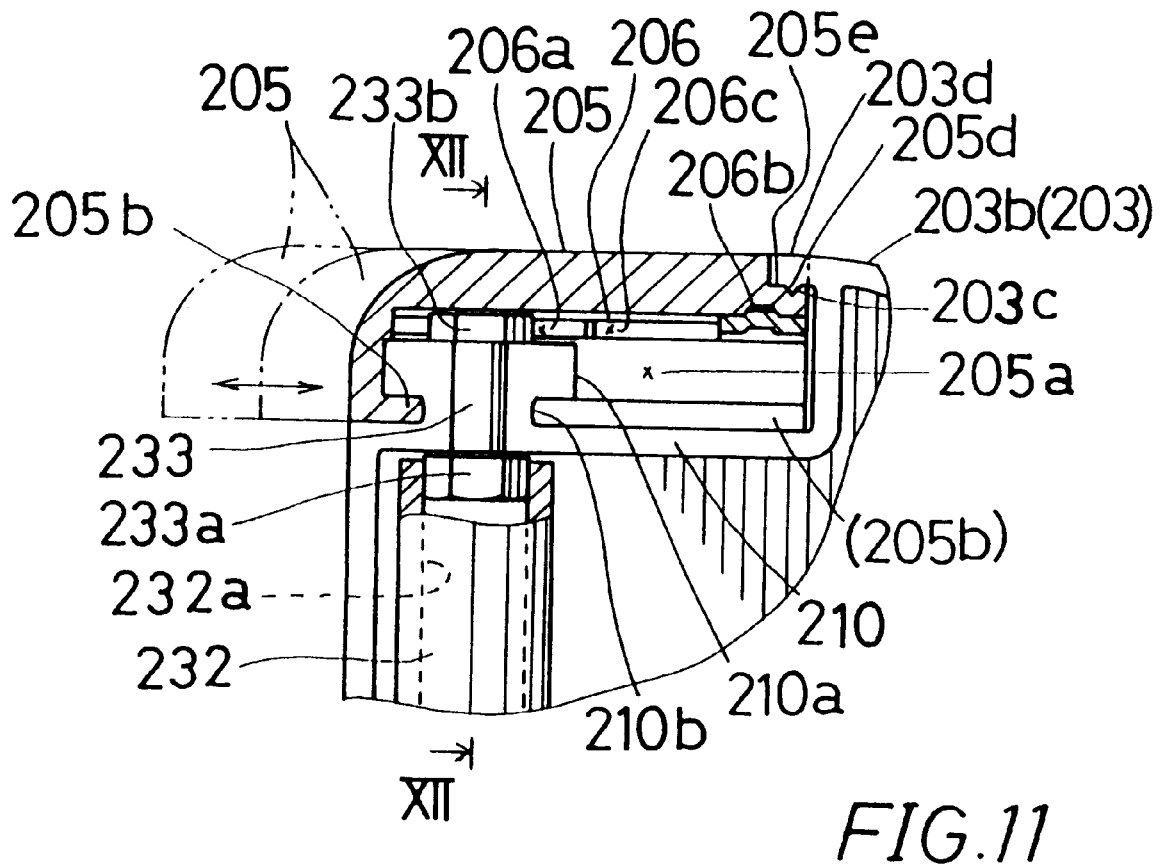
FIG. 11 is a sectional view of the essential parts of the blade mounting device shown in FIG. 10.
Figure 12:
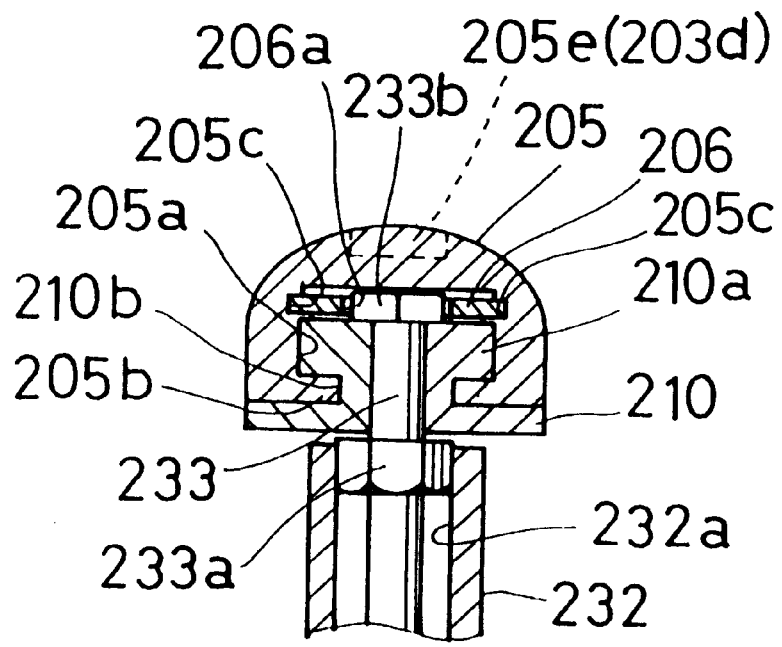
FIG. 12 is a sectional view taken along line XII—XII in FIG. 11.

As shown in FIGS. 11 and 12, the operation knob 205 has a substantially semi-cylindrical configuration and has an outer surface which is smooth when joined to the upper surface of the handle housing 203 positioned adjacent the operation knob 205 when the operation knob 205 is in a retracted position shown by solid lines in FIG. 11. Thus, the operation knob 205 forms a curved front part of the body 202 positioned forwardly of the handle 203.

A recess 205a is formed in the lower portion of the operation knob 205 for receiving the cylindrical portion 210a. As shown in FIG. 12, the width of the recess 205a is substantially the same as the diameter of the cylindrical portion 210a, so that the cylindrical portion 210a is inserted into the recess 205a without producing rattling in the widthwise direction (right and left directions in FIG. 12). The cylindrical portion 201a includes a circumferential recess 210b on its lower side. A flange portion 205b of the operation knob 205 is in engagement with the circumferential recess 210b. The flange portion 205b is formed along the open bottom of the operation knob 205 and extends inwardly of the same. Therefore, the operation knob 205 is supported on the support member 210 such that the operation knob 205 is prevented from movement in the vertical direction but is slidably movable in the forward and rearward directions (right and left directions in FIG. 11). In addition, by virtue of the cylindrical configuration of the cylindrical support portion 210a, the operation knob 205 is rotatable around the cylindrical support portion 210a.

A connection plate 206 is mounted within the upper side of the recess 205a of the operation knob 205 and extends along the upper surface of the recess 205a. The connection plate 206 has both lateral sides inserted into lateral recesses 205c which are formed in the operation knob 205. The connection plate 206 has a rear portion which in turn has a projection 206b extending upwardly therefrom for engaging the corresponding recess formed in the operation knob 205 as shown in FIG. 11, so that the connection plate 206 is held in position relative to the operation knob 205.

Figure 13:
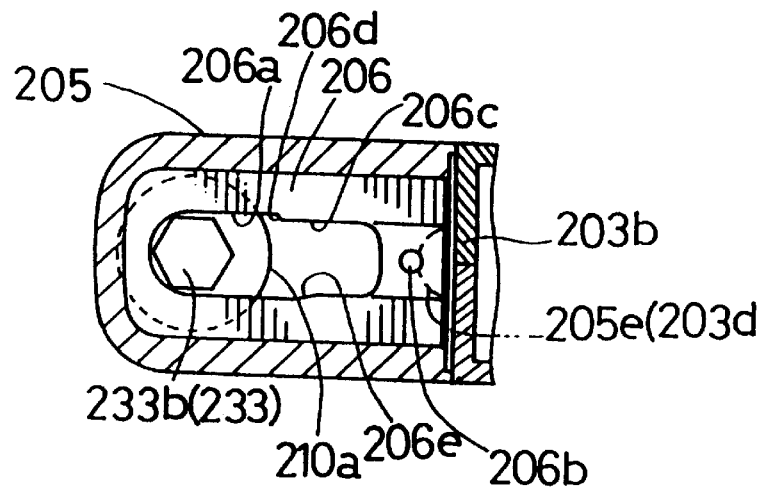
FIG. 13 is a horizontal sectional view of an operation knob of the blade mounting device shown in FIG. 11 in a retracted position.
Figure 14:
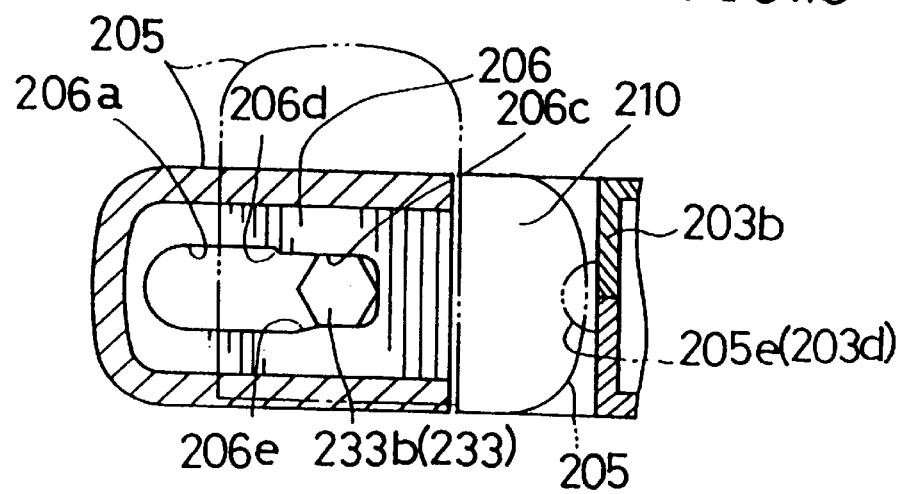
FIG. 14 is a view similar to FIG. 13 but showing the operation knob in an operational position.
Figure 15:
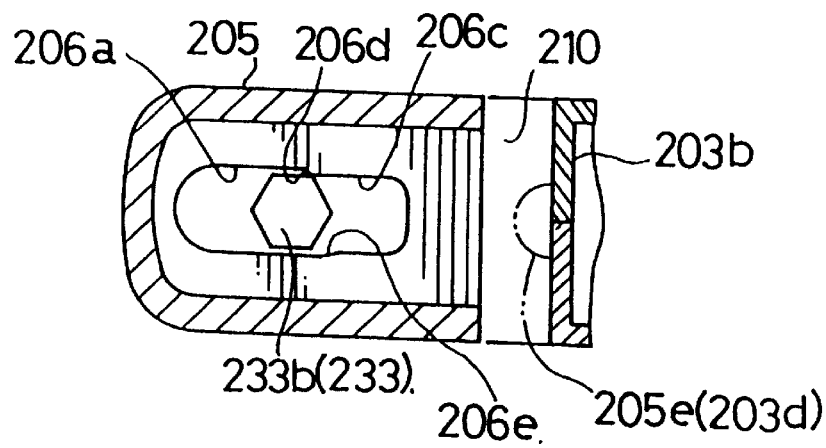
FIG. 15 is a view similar to FIG. 13 but showing the operation knob in an intermediate position.

As shown in FIGS. 13 to 15, the connection plate 206 has a central opening for receiving the hexagon shaft portion 233b of the connection rod 233. The opening is elongated in the forward and rearward directions and includes a front half 206a and a rear half 206c having different width from each other. More specifically, the front half 206a has a width slightly greater than the diameter of a circumscribed circle of the hexagon shaft portion 233b, while the rear half 206c has a width substantially equal to the diameter of an inscribed circle of the hexagon shaft portion 233b.

With the construction of the connection plate 206 as described above, when the operation knob 205 is moved forwardly from a retracted position shown in FIG. 13 to an operational position shown in FIG. 14, the hexagon shaft portion 233b enters the rear half 206c of the opening, so that the connection rod 233 is rotatable with the operation knob 205. Thus, when the operation knob 205 is rotated, the connection rod 233 is rotated with the operation knob 205, and the actuation rod 203 is in turn rotated to open and close the clamping claw of the clamping device 204 for fixing and releasing the blade.

When the operator moves the operation knob 205 rearwardly from the operational position by a distance substantially half the length of the opening to reach a middle position where the hexagon shaft portion 233b enters the front half 206a to some extent, the hexagon shaft portion 233b is rotatable relative to the operation knob 205, so that the operation knob 205 and the connection rod 233 are disconnected from each other. In this middle position, the operation knob 205 is rotatable around the connection rod 233 without interference between the rear portion of the operation knob 205 and the handle housing 203b. Therefore, when the operator moves the operation knob 205 in this middle position after the blade has been fixedly mounted through rotation of the operation knob 205 in the operational position, the operation knob 205 can be rotated to an original rotational position where the longitudinal axis of the opening extends in the forward and rearward directions, without causing rotation of the connection rod 233 or with the fixing state of the blade maintained.

After the operation knob 205 has been rotated to the original rotational position, the operator moves the operation knob 205 rearwardly to the retracted position where the rear end of the operation knob 205 abuts on a confronting wall part formed on the handle housing 203b.

In this retracted position, the operation knob 205 is no longer rotatable because the rear end of the operation knob 205 abuts on the wall part of the handle housing 203b. As shown in FIG. 11, a semi-circular recess 205e is formed on the rear upper surface of the operation knob 205 and includes a depression 205d. A semi-circular extension 203d corresponding to the semi-circular recess 205e is formed on the wall part of the handle housing 203b confronting the operation knob 205. The extension 203d has a lower surface including an engaging projection 203c formed thereon. With this construction, when the operation knob 205 is moved to the retracted position, the extension 203d of the handle housing 203d is brought to engage the recess 205e of the operation knob 205, and at the same time therewith, the engaging projection 203c is brought to engage the depression 205d, so that the operation knob 205 is reliably held in the retracted position without causing rattling in the forward and rearward directions and in the rotational direction.

The front half 206a and the rear half 206c of the opening is connected via a first oblique edge 206d on one side (upper side in FIG. 13) and via a second oblique edge 206e on the other side (lower side in FIG. 13). The inclination angle of the first oblique edge 206d relative to the longitudinal axis of the opening or the longitudinal axis of the operation knob 205 is greater than the inclination angle of the second oblique edge 206e. In addition, the positions of the first oblique edge 206d and the second oblique edge 206e are displaced from each other in the longitudinal direction of the opening. More specifically, the first oblique edge 206d is positioned forwardly (leftwardly in FIG. 13) of the second oblique edge 206e. With this arrangement, when the operation knob 205 is moved from the retracted position shown in FIG. 13 toward the operational position shown in FIG. 14 to reach the transient position between the front half 206a and the rear half 206c of the opening, the hexagon shaft portion 233b is moved into the rear half 206c of the opening under the guide of the first oblique edge 206d and the second oblique edge 206e at different timings. Therefore, the operation knob 205 is naturally rotated to a suitable rotational position where the longitudinal axis of the opening extends in parallel to any two confronting sides of the hexagon shaft portion 233b, so that the hexagon shaft portion 233b positioned in any rotational position smoothly enters the front half 206c of the opening.

On the other hand, when the operation knob 205 is moved from the operational position shown in FIG. 14 toward the retracted position shown in FIG. 13, the hexagon shaft portion 233b becomes free from restriction by the front half 206c on one side and subsequently on the other side at different timings, so that the operation knob 205 can be smoothly returned to the retracted position.

As described above, with the blade mounting device 211 of this embodiment, the operation knob 205 is moved from the retracted position to the operational position in the forward direction, and the blade can be fixed and released by rotating the operation knob 205 in the operational position. When the operator rotates the operation knob 205 with the operation knob 205 grasped with his hand, a downward pressing force may be applied to the operation knob 205. However, with this embodiment, the lower side of the operation knob 205 is supported by the support member 210, so that the operation knob 205 may not be moved downwardly even if it has received the downward pressing force. Therefore, the rotational connection between the operation knob 205 and the actuation rod 231 may not be loosen even if the downwardly pressing force has been applied to the operation knob 205. In a conventional blade mounting device having a clutch mechanism which is operated to connect and disconnect when an operation knob is positioned at a lower position and at an upper position, respectively, the operation knob may be accidentally lowered to disconnect the clutch when the operation knob has been grasped by the operator for rotation of the same.

Thus, with this embodiment, the rotational torque applied to the operation knob 205 is reliably transmitted to the actuation rod 231 without interruption, so that the blade can be reliably fixed in position. In addition, since the rotational operation can be performed without taking care of possible interruption of transmission, the operability of the operation knob 205 is improved.

While the invention has been described with reference to preferred embodiments thereof, it is to be understood that modifications or variations may be easily made without departing from the spirit of this invention which is defined by the appended claims.

What is claimed is:

1. A device for mounting a blade on a drive shaft of a cutting tool which is moved in a predetermined motion for a cutting operation, comprising:

an operation knob mounted on a body of the cutting tool and configured to be rotated by an operator;

an actuation rod mounted on the drive shaft in an axial direction, said actuation rod being movable with the drive shaft and being rotatable relative to the drive shaft;

thread means provided between said actuation rod and the drive shaft for moving said actuation rod in an axial direction when said actuation rod is rotated relative to the drive shaft;

holder means mounted on the drive shaft, said holder means being movable between a holding position and a releasing position for holding and releasing a blade, respectively;

motion converting means for converting rotation in one direction of said actuation rod into movement of said holder means toward said holding position and for converting rotation in a reverse direction of said actuation rod into movement of said holder means toward said releasing position;

a rotational force of said actuation rod in said one direction being transmitted to said holder means being a tightening force for holding the blade;

a rotatably supported member disposed in the axial direction of said actuation rod and rotatable together with the operation knob, first connecting means for connecting said supported member and said actuation rod to each other, said connecting means enabling the supported member and said actuation rod to move relative to each other in the axial direction when rotated by the operation knob;

said first connecting means including a shaft portion provided on one of said supported member and said actuation rod and including an axial hole provided on the other for receiving said shaft portion;

said shaft portion having a closed figure polygonal outer peripheral configuration, and said axial hole having a closed figure polygonal inner peripheral configuration conforming to the closed figure polygonal outer peripheral configuration of said shaft portion; said operation knob being movable between an operational position for operation by an operator and a retracted position retracted into said body, and further including second connection means for connecting said operation knob and said support member, so that said support member is rotatable with said operation knob irrespective of movement of said operation knob between said operational position and said retracted position in the vertical direction along the same axis as said actuation rod and said support member, and wherein said second connection means connects said operation knob and said support member to permit axial movement relative to each other.

2. The blade mounting device as defined in claim 1 wherein the actuation rod has a cylindrical configuration, the actuation rod is inserted into said drive shaft, said actuation rod has an upper end extending upwardly of the drive shaft, and said first connecting means is disposed between said upper end of said actuation rod and said supported member.

3. The blade mounting device as defined in claim 2 wherein said upper end of the actuation rod includes the shaft portion of said first connecting means, the supported member has a tubular configuration having the axial hole of said first connecting means formed therein, so that an upper portion of said drive shaft as well as said upper portion of the actuation rod having said shaft portion is insertable into the axial hole of said support member.

4. The blade mounting device as defined in claim 1 wherein said second connecting means includes a pin for vertically pivotally supporting said operation knob relative to said support member.

5. The blade mounting device as defined in claim 1 wherein said second connecting means includes a second shaft portion provided on one of said operation knob and said support member and includes a second axial hole provided on the other for receiving said second shaft portion, said second shaft portion having a non-circular outer peripheral configuration and said second axial hole having a non-circular inner peripheral configuration.

6. The blade mounting device as defined in claim 1 wherein said operation knob is movable between an operational position for operation by an operator and a retracted position retracted into said body, and wherein clutch means is provided between said operation knob and said support member, said clutch means being operable to connect said operation knob and said support member so as to permit transmission of rotation of said operation knob to said support member when said operation knob is in said operational position, and said clutch means being operable to disconnect said operation knob and said support member to prevent transmission of operation knob rotation to the support member when said operation knob is in the retracted position.

7. The blade mounting device as defined in claim 1 wherein said operation knob is mounted in a recess formed in a grip portion of said body, said grip portion being adapted to be grasped by an operator with his hand, and wherein said operational knob is movable between a retracted position and an operational position, said operational knob in said retracted position being substantially positioned within said recess, and at least a part of said operational knob in said operational position extending outwardly from said recess, so that said operational knob can be grasped by the operator independently of said grip portion.

8. The blade mounting device as defined in claim 7 wherein said operation knob is vertically pivotally mounted in said recess, and wherein said operation knob is pivoted from said retracted position to said operational position by an angle of about 90°.

9. The blade mounting device as defined in claim 8 wherein a pushing member is mounted in said recess and is configured to be pushed by the operator for pivoting said operational knob from said retracted position to said operational position.

10. The blade mounting device as defined in claim 9 wherein said pushing member is configured to pivot between a first position adjacent an open top of said recess and a second position adjacent a bottom of said recess, wherein said operation knob in said retracted position is engaged in its pivotal direction by said pushing member as said pushing member is moved from said first position toward said second position, and wherein said operational knob is moved to said operational position when said pushing member reaches said second position.

11. The blade mounting device as defined in claim 8 wherein said operation knob in said retracted position frictionally contacts an inner wall of said recess.

12. The blade mounting device as defined in claim 7 wherein said operation knob moves between said operational position and said retracted position along the same axial direction as said support member and said actuation rod.

13. The blade mounting device as defined in claim 1 wherein said operation knob is movable in a direction substantially perpendicular to the axial direction of said support member and said actuation rod between an operational position for operation by an operator with his hand and a retracted position retracted in said body.

14. The blade mounting device as defined in claim 13 wherein said operation knob in said retracted position is positioned within a recess formed in said body, the operation knob having an outer surface which is smooth when joined to an outer surface of said body when said operation knob is in said retracted position, and wherein at least a portion of said operation knob extends horizontally from said body when said operation knob is in said retracted position.

15. The blade mounting device as defined in claim 13 wherein clutch means is provided between said operation knob and said support member, said clutch means being operable to connect said operation knob and said support member to permit transmission of rotation of the operation knob to said support member when said operation knob is in said operational position, and said clutch means being operable to disconnect said operation knob from said support member to prevent transmission of rotation when the operation knob is in the retracted position.

16. The blade mounting device as defined in claim 14 wherein said operation knob has an abutting surface formed on the side confronting part of an inner wall of said recess, so that said operation knob in the retracted position is prevented from rotation when said abutting surface faces the part of the inner wall.

17. The blade mounting device as defined in claim 16 and further including a detent mechanism for holding said operation knob in said retracted position.

18. A blade mounting device for mounting a blade on a drive shaft of a cutting tool which is moved in a predetermined motion for a cutting operation, comprising:

an operation knob mounted on a body of the cutting tool configured to be rotated by an operator;

a cylindrical actuation rod extending in an axial direction mounted on the drive shaft having a tubular configuration;

thread means including a male thread formed on a lower portion of said actuation rod and a female thread formed on an inner wall of the drive shaft, so that the actuation rod is movable in an axial direction together with the drive shaft and is rotatable relative to the drive shaft;

holder means mounted on the drive shaft for holding and releasing a blade;

motion conversion means provided between said actuation rod and said holder means for converting rotation in one direction of said actuation rod into movement of said holder means toward a holding position and for converting rotation in a reverse direction of said actuation rod into movement of said holder means toward a releasing position;

a rotational force of said actuation rod in said one direction being transmitted to said holder means as a tightening force of the blade; and a tubular support member rotatable with said operation knob and disposed in the same axial direction as said actuation rod;

said actuation rod having an upper end comprising a shaft portion extending upwardly from the drive shaft, and said tubular support member having an axial direction hole for receiving said shaft portion, said actuation rod being rotatable with said tubular support member and being movable in the axial direction relative to said tubular support member; and an upper end of the drive shaft as well as said shaft portion of said actuation rod being inserted into the axial hole of said tubular support member.

* * * * *